United States Patent [19]
Kistler et al.

[11] 4,140,642
[45] Feb. 20, 1979

[54] EMULSIFIABLE MIXTURE OF OIL SOLUBLE ALKYLBENZENE SULFONATE SALTS HAVING TWO DIFFERENT MOLECULAR WEIGHT MAXIMA

[75] Inventors: Jean-Paul Kistler, Mont-Saint-Aignan; Pierre-Dominique Marin, Rouen, both of France

[73] Assignee: Exxon Research & Engineering Co., Florham Park, N.J.

[21] Appl. No.: 649,905

[22] Filed: Jan. 16, 1976

Related U.S. Application Data

[63] Continuation of Ser. No. 555,460, Mar. 5, 1975, abandoned.

[30] Foreign Application Priority Data

Mar. 8, 1974 [FR] France .............................. 74 08003
Jul. 17, 1974 [FR] France .............................. 74 24785

[51] Int. Cl.² ........................ B01F 17/12; C10M 1/40
[52] U.S. Cl. ........................................ 252/33; 166/9; 166/273; 166/275; 166/281; 166/308; 252/8.5 P; 252/33.2; 252/526; 252/558; 252/312; 252/353; 252/355; 252/388; 252/395; 260/505 A
[58] Field of Search ............... 252/33, 33.2, 389, 395, 252/353, 355, 161, 137, 8.5 P, 312; 166/9, 275, 273, 308, 281; 260/505

[56] References Cited

U.S. PATENT DOCUMENTS

| | | | |
|---|---|---|---|
| 2,436,046 | 2/1948 | Lemmon et al. | 252/33 X |
| 2,708,182 | 5/1955 | Jahn | 252/33 |
| 2,739,124 | 3/1956 | Otto et al. | 252/33 |
| 3,012,965 | 12/1961 | Sias | 252/33 |
| 3,422,161 | 1/1969 | Lavigne et al. | 252/33 X |
| 3,458,449 | 7/1969 | Mausner et al. | 252/182 |
| 3,470,097 | 9/1969 | Lavigne et al. | 252/33 |
| 3,480,550 | 11/1969 | Henderson et al. | 252/33 |
| 3,647,899 | 3/1972 | Strauss | 260/688 |
| 3,764,533 | 10/1973 | Hunt et al. | 252/33 |
| 3,769,243 | 10/1973 | Strauss | 252/558 |

*Primary Examiner*—Floyd D. Higel
*Attorney, Agent, or Firm*—Frank T. Johmann

[57] ABSTRACT

Emulsifier compositions, suitable for mixing with mineral oil to form metal working lubricants, comprise a mixture of salts of alkylaryl sulfonic acids, said acids having a molecular weight distribution with two distinct peaks, one peak being preferably in the range of 270 to 400, while the other peak is in the range of 350 to 600; which peaks differ at least 80. Mixtures of 5 to 95 wt. % sodium salts of branched chain $C_{12}$ to $C_{16}$ alkyl orthoxylenesulfonic acids with 95 to 5 wt. % sodium salts of branched chain $C_{20}$ to $C_{28}$ alkyl benzenesulfonic acids are especially preferred compositions, particularly when blended with naphthenic mineral oil, to thereby form stable emulsifiable metal working lubricants.

13 Claims, No Drawings

EMULSIFIABLE MIXTURE OF OIL SOLUBLE ALKYLBENZENE SULFONATE SALTS HAVING TWO DIFFERENT MOLECULAR WEIGHT MAXIMA

This is a continuation of application Ser. No. 555,460, filed March 5, 1975 and now abandoned.

This invention relates to emulsifier compositions and to uses thereof.

Alkylaryl sulfonates are widely used as emulsifiers for many purposes, including the formulation of emulsifiable lubricating compositions for use in metal working operations. For a long time natural sulfonates have been employed. They are not expensive materials but, however, they have disadvantages. Thus they are not very constant in their quality, and hence in their emulsifying properties. In order to improve the emulsifying powers of these known sulfonates it is customary to associate with them secondary surface active agents of different types, more especially non-ionic types or fatty acid salts. But, to achieve consistent results, the amounts of these secondary compounds required differ according to the quality of the sulfonate being employed.

It is an object of this invention to provide alkylaryl sulfonates having improved characteristics.

In its widest aspect the present invention provides an emulsifier composition comprising salts of alkylaryl sulfonic acids and an organic or mineral base, wherein the molecular weights of the acids from which the salts are derived are distributed in accordance with the function $C = f(M)$, where C denotes concentration and M denotes molecular weight of individual acids, which function has two distinct molecular weight maximum $M_1$ and $M_2$, with $M_1 < M_2$.

The alkylaryl sulfonates heretofore known are mixtures of homologous chemical compounds. In these mixtures, the distribution of the molecular weights complies largely either with Gauss's or with Poisson's law. "C" being the concentration in the mixture of the constituents whose molecular mass is "M", the function $C = f(M)$ displays one maximum and one alone.

The new alkylaryl sulfonates which form the object of the present invention are salts of alkylaryl sulfonic acids and a mineral or organic base, in which the molecular weights of the said acids are distributed according to a function $C = f(M)$ which has two distinct maxima.

The sulfonic acid salts of this invention may be either inorganic or organic. The preferred inorganic salts are sodium salts. However, ammonium salts, or those of the other alkali metals, or of the alkaline earth metals are possible. The organic bases which may be employed are nitrogen bases, for example, a primary, secondary or tertiary amine, a polyamine, an alkanolamine etc. The preferred organic bases are monoethanolamine, diethanolamine, triethanolamine and mixtures of these ethanolamines.

In general the value of $M_1$ should be at least 270. The value of $M_1$ may be 270 to 360, but is preferably 270 to 400 and is more preferably from 360 to 400.

In general the value of $M_2$ should be from 350 to 600 and is preferably from 450 to 550.

In accordance with an important feature of the invention it is preferred that the difference $M_2-M_1$ shall be at least 40, desirably in the range 40 to 350. Especially advantageous emulsifier compositions are obtained when the difference $M_2-M_1$ lies in the range 80 to 350, particularly 80 to 220, and these latter two ranges are strongly preferred.

The overall mean molecular weight of the alkylaryl sulfonic acids contained in the alkylaryl sulfonate compositions according to the invention is chosen as a function of the nature of the base with which they are combined and of the particular use for which the emulsifier is intended. The most favourable overall mean molecular weight depends in particular on the more or less polar character of the organic phase it is desired to disperse in water. In most cases the overall mean is between 300 and 550, preferably 300 to 500, more preferably 375 to 500.

The alkylaryl sulfonates according to the invention can be prepared by mixing in a suitable proportion alkylaryl sulfonates containing alkylaryl sulfonic acids whose mean molecular mass is $M_1$ and alkylaryl sulfonates containing alkylaryl sulfonic acids whose mean molecular mass is $M_2$.

They can also be prepared by neutralising with a base a mixing consisting of appropriate proportions of alkylaryl sulfonic acids whose mean molecular mass is $M_1$ and alkylaryl sulfonic acids whose mean molecular mass is $M_2$.

The alkylaryl sulfonates according to the invention can still further be prepared by sulfonating a mixture containing appropriate proportions of aromatic hydrocarbons whose mean molecular weight is $M_1-80$ and aromatic hydrocarbons whose mean molecular weight is $M_2-80$, then neutralising with a base the sulfonic acids thus obtained.

The alkylaryl sulfonic acids from which the sulfonates according to the invention are derived can be of the same type as those obtained by sulfonating an appropriate fraction of crude petroleum.

The preferred sulfonates are derived from alkylaryl sulfonic acids which have been prepared by sulfonating alkylbenzenes. By alkylbenzenes is meant the alkylation products of benzene itself; its homologues with up to 10 carbon atoms, such as toluene, xylenes, ethylbenzene; the alkylating agent being olefins, olefin oligomers, or chloroparaffins, of appropriate mean molecular weights.

In accordance with a further important feature of the invention the alkyl groups of the alkylaryl sulfonates are branched-chain alkyl groups. Unexpectedly, improved emulsion stability is often found in such cases. Accordingly, it is preferred that at least a proportion of an emulsifier composition according to this invention is made up of branched-chain alkyl type compounds. Preferably a major proportion, and most preferably all, the composition is of such compounds.

Highly preferred are alkylaryl sulfonates derived from benzene and orthoxylene especially when the alkyl groups are branched-chain, for example when propylene oligomers are the alkylating means.

Preferred emulsifier compositions in accordance with this invention give rise to unexpected advantages especially in emulsion stability properties and in many cases are superior to the known sulfonates. In addition, as has been previously stated, they can be prepared to be of substantially constant quality. Specifically preferred compositions are those containing low average molecular weight salts of $C_8$ to $C_{16}$ alkyl (especially branched-chain alkyl) orthoxylene sulfonic acids, together with high molecular weight salts of $C_{18}$ to $C_{28}$ alkyl (especially branched-chain alkyl) benzene sulfonic acids.

More preferably the groups are, respectively, $C_{10}$ to $C_{16}$ and $C_{20}$ to $C_{28}$. Especially suitable compositions are obtained when said groups are, respectively, $C_{12}$ to $C_{16}$ and $C_{20}$ to $C_{28}$. In all cases it is most preferred that these alkyl groups are branched-chain alkyl groups. In all cases sodium salts are the preferred compounds.

One particular range of compositions having especially good emulsion stability properties comprises mixtures of (a) sodium alkylaryl sulfonates having a mean molecular weight in the range 360 to 400, preferably 370 to 395, more preferably 370 to 380, in which the alkylaryl moiety is the alkylation product of orthoxylene with tetrapropylene; and (b) sodium alkylbenzene sulfonates having a mean molecular weight in the range 500 to 530, preferably 515 to 530, more preferably about 520, in which the alkylaryl moiety is the alkylation product of benzene with a propylene oligomer of an average of 24 carbon atoms per molecule.

For such compositions overall mean average molecular weights in the range 400 to 525 are preferred; highly preferred compositions can have overall figures of about 410 to 420; about 430 to 450; about 480 to 510.

The proportions of each component in compositions according to the invention are most preferably in the range 95 to 5 wt.% of salts of the said $M_1$ acids and 5 to 95 wt.% of salts of the said $M_2$ acids. Other suitable ranges are (1) 90 to 10% of one and 10 to 90% of the other, (2) 80 to 20% of one and 20 to 80% of the other.

Normally it will be found that the alkylaryl sulfonates are highly viscous materials and, accordingly, are advantageously diluted either in manufacture, or thereafter, with a suitable diluent/solvent, such as a hydrocarbon oil of the light lubricating oil type. The invention includes within its scope concentrates containing 50 to 95 wt.% of the emulsifier composition and 50 to 5 wt.% of a solvent/diluent, such as a light lubricating oil, for example one having a viscosity of 20 to 40 cSt at 40° C.

However, unless otherwise stated, reference herein to emulsifier composition is reference only to the sulfonates and not to any solvent/diluent which may be desirable for convenient handling of the sulfonates.

In accordance with a further feature of the invention there is provided an emulsifiable mineral oil composition containing a mineral oil and an emulsifier composition as herein described. Suitable mineral oils are those having a viscosity of from 5 to 100 cSt at 40° C. An unexpected and particularly advantageous benefit arising from the invention is that, especially when the emulsifier composition employed is one of the specifically preferred compositions herein described, when the mineral oil is of a naphthenic character then no other emulsifier is required.

Thus, for example, the invention provides a cutting oil for metal working, based on mineral oil, especially a naphthetic oil, whose viscosity is between 5 and 100 cSt at 40° C., containing from 1 to 5% by weight of one or more extreme pressure lubricating agents, from 1 to 5% by weight of one or more anti-corrosion agents and from 0.1 to 3% by weight of one or more bactericidal agents and from 10 to 50% by weight of the alkylaryl sulfonates defined herein.

By dispersing this cutting oil in water, a stable aqueous emulsion for metal working is obtained. This emulsion is likewise covered by the scope of the present invention, and may contain 90 to 99%, suitably about 95 to 98% water.

The following non-limitative examples illustrate features of the invention. All proportions referred to in these examples are calculated by weight. All the concentrates considered in these examples contained 60% active matter and 40% diluent. The latter was a hydrocarbon oil characterised by a viscosity of 32 cSt at 40° C.

EXAMPLE 1

A concentrate X1 of alkylaryl sulfonates was prepared according to the invention by mixing 73% of a concentrate A and 27% concentrate B.

Concentrate A contained 60% sodium alkylbenzene sulfonates whose mean molecular mass was 370 and which had been prepared from the alkylation product of orthoxylene and a technical tetrapropylene.

Concentrate B contained 60% sodium alkylbenzene sulfonates whose mean molecular mass was 520, and which had been prepared from the alkylation product of benzene and a propylene oligomer. The mean carbon condensation of this oligomer was 24 atoms per molecule.

The concentrate X1 therefore contained 60% alkylbenzene - sodium sulfonates whose mean molecular mass was 405 and the distribution of whose molecular weight displayed two maxima, corresponding to the molecular weights 370 and 520.

EXAMPLE 2

A concentrate X2 was prepared of alkylaryl sulfonates according to the invention by mixing 75% of concentrate A defined in Example 1 and 25% concentrate C.

Concentrate C contained 60% sodium alkylbenzene sulfonates whose mean molecular weight was 580, and which had been prepared from the alkylation product of orthoxylene and a propylene oligomer. The mean carbon condensation of the latter was 27 atoms per molecule.

Concentrate X2 therefore contained 60% sodium alkylbenzene sulfonates whose mean molecular weight was 405, and the distribution of whose molecular masses displayed two maxima corresponding to the molecular weight 370 and 580.

EXAMPLE 3

A concentrate X3 was prepared of alkylaryl sulfonates according to the invention, by mixing 65% of a concentrate D and 35% of concentrate B defined in Example 1.

The concentrate D contained 60% sodium alkylbenzene sulfonates whose mean molecular weight was 300, and which had been prepared from the alkylation product of benzene and a technical tripropylene.

The concentrate X3 therefore contained 60% sodium alkylbenzene sulfonates whose mean molecular weight was 353 and the distribution of whose molecular weight displayed two maxima corresponding to the molecular masses 300 and 320.

EXAMPLE 4

The emulsifying power of the alkylbenzene sulfonates X1, X2 and X3, defined in the foregoing examples, in relation to a mineral oil dispersed in water, was compared with that of the various commercial alkylaryl sulfonates.

To conduct these tests an oil with naphthetic tendency was used, derived from crude petroleum by means of the usual processes of distilling and refining. This oil had a viscosity of 27 cSt at 37.8° C. The hardness of the water used was 22° (French hardness).

Each test was performed according to the following method of operation.

One part by weight of the concentrate being tested and 4 parts by weight of oil are mixed. In 95 parts by weight of water there are dispersed 5 parts by weight of the emulsifiable composition thus prepared. An emulsion is obtained which is allowed to stand for 7 days at 20° C., in a stoppered graduated test-tube. The emulsion is considered to be stable if the volume of the salted-out phase (oil or cream) after 7 days is less than 1% of the total volume of the emulsion.

The emulsion obtained with products X1, X2 and X3 are stable under these conditions.

Under the same conditions were tested 5 commerical sodium alkylaryl sulfonates, derived from the sulfonation of mineral oils, whose mean molecular weights were individual peaks in the range 350 to 550. None of these alkylaryl sulfonates furnished a stable emulsion.

Also tested under the same conditions were the alkylbenzene sulfonates A, B, C and D defined in Exaples 1 to 3. All these sulfonates, used separately, resulted in salting-out exceeding 4% by volume.

Of the foregoing concentrates it was found that Concentrate X1 of Example 1 gave the most desirable emulsion properties. When, however, the $C_{24}$ benzene sulfonate was replaced by a $C_{18}$ benzene sulfonate the stability of the emulsion produced was much less. This illustrates the highly preferred feature that the difference $M_2-M_1$ herein referred to should be at least 80.

The concentrate X2, giving less desirable properties than X1, indicates the unexpected advantages of employing components of the type represented in X1 (i.e. a high molecular weight benzene type and a low molecular weight orthoxylene type).

We claim:

1. An emulsifiable hydrocarbon oil composition, suitable for stable emulsification with water for preparation of lubricating compositions for metal working, comprising 5 to 50 wt. % of a mineral oil having a viscosity of about 5 to 100 centistokes at 40° C. and 10 to 50 wt. % of a sulfonate mixture, as emulsifier, consisting essentially of neutral salts of synthetic alkylaryl sulfonic acid, said sulfonic acid having an overall mean molecular weight of between 300 and 550, said sulfonic acid being made by alkylating benzene, or its homologues having up to 10 carbom atoms, said salts being selected from the group consisting of sodium, ammonium and amine salts; wherein the molecular weights of the acids from which the salts are derived are distributed in accordance with the function $C = f(M)$, where C denotes concentration and M denotes molecular weight of individual acids, which function has two distinct molecular weight maxima $M_1$ and $M_2$, wherein: $M_1$ is in the range of 270 to 400, $M_2$ is in the range of 350 to 600, and the difference $(M_2 - M_1)$ is 80 to 350; wherein said mixture is formed by mixing 20 to 80 wt. % of salts from said $M_1$ molecular weight acid and 80 to 20 wt. % of salts from said $M_2$ molecular weight acid, or is formed by mixing said $M_1$ and $M_2$ acids and then neutralizing with base in proportions to give 20 to 80 wt. % of salts from said $M_1$ molecular weight acid and 80 to 20 wt. % of salts of said $M_2$ molecular weight acid.

2. An emulsifiable composition as claimed in claim 1, wherein said salts are neutral sodium salts of alkylaryl sulfonic acid selected from the group consisting of alkylbenzene sulfonic acids and alkylorthoxylene sulfonic acids and said mixture is formed by mixing salts from said $M_1$ molecular weight acid with salts of said $M_2$ molecular weight acid.

3. An emulsifiable composition as claimed in claim 1, wherein the alkyl groups are branched-chain alkyl groups.

4. An emulsifiable composition as claimed in claim 1, wherein said salts are sodium salts.

5. An emulsifiable composition as claimed in claim 1, wherein said salts consist essentially of neutral sodium salts of $C_8$ to $C_{16}$ alkylorthoxylene sulfonic acids and $C_{18}$ to $C_{28}$ alkylbenzene sulfonic acids, and said mineral oil is a naphthenic lubricating oil.

6. An emulsifiable composition as claimed in claim 5, wherein said alkyl groups are respectively $C_{10}$ to $C_{16}$ and $C_{20}$ to $C_{28}$.

7. An emulsifier composition suitable for mixing with mineral oil and water to form stable emulsions as lubricants for metal working, comprising a sulfonate mixture, wherein the sulfonic acid of said sulfonate has an overall mean molecular weight of between 300 and 550, said sulfonate mixture consisting essentially of:

(a) 10 to 90 wt. % neutral sodium alkylaryl sulfonates having a mean molecular weight in the range 360 to 400 and in which the alkylaryl moiety is the alkylation product of orthoxylene with tetrapropylene; and (b) 90 to 10 wt. % neutral sodium alkylbenzene sulfonates having a mean molecular weight in the range 500 to 530 and in which the alkylaryl moiety is the alkylation product of benzene and a propylene oligomer of an average of 24 carbon atoms per molecule, said sulfonate mixture being formed by either mixing said (a) and (b) sulfonates, or by neutralizing with base a mixture of the sulfonic acids of said (a) and (b) sulfonates.

8. An emulsifier composition as claimed in claim 7, wherein said ranges in (a) and (b) are respectively 370 to 395 and 515 to 530.

9. An emulsifier composition as claimed in claim 7, wherein said mean molecular weight in (a) and (b) are respectively 370 to 395 and 515 to 530.

10. An emulsifiable mineral oil composition comprising a major amount of a mineral oil having a viscosity of about 5 to 100 centistokes at 40° C., and, as sole emulsifier, the emulsifier composition defined in claim 7.

11. An emulsifiable mineral oil composition comprising a major amount of naphthenic mineral oil having a viscosity of about 5 to 100 centistokes at 40° C., and, as sole emulsifier, the emulsifier composition defined in claim 8.

12. A stable oil-in-water lubricating emulsion comprising 90 to 99 wt. % water and the emulsifiable hydrocarbon oil composition according to claim 1.

13. A stable oil-in-water emulsion comprising 90 to 99 wt. % water, and the emulsifiable hydrocarbon oil composition according to claim 6.

* * * * *